United States Patent [19]

Lupke et al.

[11] 4,226,580
[45] Oct. 7, 1980

[54] APPARATUS FOR PRODUCING THERMOPLASTIC TUBING

[76] Inventors: Gerd P. H. Lupke, 46 Stornoway Cres.; Manfred A. A. Lupke, 35 Ironshield Cres., both of Thornhill, Ontario, Canada

[21] Appl. No.: 868,702

[22] Filed: Jan. 11, 1978

[30] Foreign Application Priority Data

Feb. 7, 1977 [CA] Canada ............................. 271188

[51] Int. Cl.$^3$ ...................... B29C 17/07; B29D 23/04
[52] U.S. Cl. .............................. 425/504; 156/244.14; 156/500; 264/508; 425/505; 425/516; 425/112; 425/113; 425/131.1; 425/326.1; 425/336; 425/369
[58] Field of Search ...................... 425/72 R, 112, 113, 425/326.1, 336, 369, 370, 503, 505, 504, 516, 532, 131.1; 264/508, 46.1, 46.3; 156/244.14, 244.15, 500

[56] References Cited

U.S. PATENT DOCUMENTS

| | | | |
|---|---|---|---|
| 3,376,180 | 4/1968 | Larson et al. | 156/244.14 X |
| 3,758,354 | 9/1973 | Sakurai et al. | 264/46.1 X |
| 3,758,370 | 9/1973 | Sakurai et al. | 156/244.14 X |
| 3,976,414 | 8/1976 | Hegler et al. | 425/131.1 |
| 3,996,323 | 12/1976 | Hegler et al. | 264/508 |
| 4,033,709 | 7/1977 | Kroyer | 425/336 X |

Primary Examiner—Jan H. Silbaugh
Attorney, Agent, or Firm—Ridout & Maybee

[57] ABSTRACT

An apparatus for producing multi-walled thermoplastic tubing having a corrugated wall and a substantially smooth inner wall secured to the corrugated wall, there is incorporated two sets of endless flexible belts each of which is entrained around rotatable end rolls, the outer runs of the belts of one of the sets thereof alternating with the outer runs of the other of the sets thereof, with these outer runs of the various belts serving to urge the inner wall against the corrugations of the corrugated wall while the thermoplastic material of the walls is soft thereby to secure the walls together, and with an electrically energizeable heating coil being provided for softening the thermoplastic material of the corrugated wall to ensure satisfactory securement between the walls. The apparatus also incorporates a suction chamber, a cooling chamber forwardly of the suction chamber, and a pressure chamber forwardly of the cooling chamber, the suction chamber communicating with passages in the mold blocks which constitute a tubular mold tunnel in which the tubing is formed to urge the appropriate wall against the tubular mold tunnel thereby to form the corrugated wall, cooling air flowing from the cooling chamber through these passages and exhausting through spring-loaded check valves to cool the mold blocks, and pressurized air flowing from the pressure chamber through the passages to eject the finished tubing from the tubular mold tunnel at the forward end thereof, during which the check valves are maintained closed.

11 Claims, 10 Drawing Figures

APPARATUS FOR PRODUCING THERMOPLASTIC TUBING

This invention is concerned with apparatus for producing thermoplastic tubing, and more particularly with such apparatus which is of the type comprising a pair of complementary mold assemblies each of which has an endless array of articulately interconnected mold blocks, drive means being provided for driving the mold blocks of each mold assembly in synchronism with the mold blocks of the other mold assembly along a forward run in which the mold blocks of the mold assemblies are in cooperative interengagement to provide an axially extending tubular mold tunnel, and back along a return run. Extrusion head means is provided for forming a tube of thermoplastic material, and gas pressure means is provided for urging the tube of thermoplastic material outwardly against the cooperatively interengaged mold blocks forming the tubular mold tunnel to form the tubing.

It has hitherto been known to provide apparatus of the above-described type in which the apparatus is for producing multi-walled thermoplastic tubing having a corrugated wall and a substantially smooth inner wall secured to the corrugated wall. Such tubing has the advantage that the corrugated wall considerably increases the resistance of the tubing to forces which tend, when the tubing is in use for example as underground drainage tubing, to crush the tubing, while the substantially smooth inner wall minimizes the resistance to fluid flow through the tubing. In such apparatus for producing multi-walled thermoplastic tubing the mold blocks are so formed that the tubular mold tunnel has a corrugated wall, and the extrusion head means operatively forms a first tube of thermoplastic material at a first position and a second tube of thermoplastic material at a second position spaced forwardly of said first position, the gas pressure means operatively urging the first tube outwardly against the cooperatively interengaged mold blocks forming the tubular mold tunnel thereby to form the corrugated wall of the tubing, and means being provided for urging the second tube into securement with the corrugations of the first tube.

It is a primary object of one aspect of the present invention to provide such apparatus having improved means for urging the second tube into securement with the corrugations of the first tube. According to this one aspect of the present invention this improved means comprises a series of endless members which are each mounted forwardly of said second position around rotatably end rolls for urging the second tube into securement with the corrugations of the first tube.

In the use of apparatus of the said type hereinbefore described it is desirable, after the tube of thermoplastic material has been urged outwardly against the cooperatively interengaged mold blocks forming the tubular mold tunnel, for the tubing which is thereby formed to be subjected to a positive cooling operation in order to set the thermoplastic material of the tubing, and for the tubing thereafter to be subjected to an operation which ensures ejection of the formed tubing from the mold blocks at the forward end of the tubular mold tunnel. In order to achieve these desirable results there is preferably provided in the mold blocks first passages which extend between the tubular mold tunnel defining faces and ports in external faces of the mold blocks, and second passages extend between the first passages and external faces of the mold blocks. A stationary suction chamber which is connectible to a suction source is so positioned as to communicate through said ports with said first passages during movement of the mold blocks along the forward runs, a stationary cooling chamber which is connectible to a source of cooling fluid is so positioned forwardly of the suction chamber as to communicate through said ports with said first passages during continued movement of the mold blocks beyond the suction chamber along the forward runs, and a stationary pressure chamber which is connectible to a source of pressurized fluid is so positioned forwardly of the cooling chamber as to communicate through said ports with said first passages during further continued movement of the mold blocks beyond the cooling chamber along the forward runs, the first passages and the suction chamber comprising the said gas pressure means of the apparatus of the aforesaid type. Closure means is provided for closing said second passages while the first passages communicating therewith are in communication through said ports with the suction chamber and with the pressure chamber, and for opening said second passages while the first passages communicating therewith are in communication through said ports with the cooling chamber.

As indicated above, thermoplastic tubing produced by apparatus of the said type hereinbefore described is frequently disposed underground when in use. In order to facilitate detection of the location of the tubing when disposed underground there is preferably provided means for disposing particles of a tracer material on an inner face of the first tube at a position between said first and second positions.

Furthermore, in order for example to strengthen the tubing which is produced there is preferably provided means for disposing on an inner face of the first tube at a position between said first and second positions a foamable material which on foaming after the second tube has been secured to the corrugations of the first tube substantially occupies the corrugations between the first tube and the second tube.

Still furthermore, there is provided according to a second aspect of the present invention apparatus of the said type hereinbefore described in which the apparatus is for producing multi-walled thermoplastic tubing having a corrugated wall and a substantially smooth inner wall secured to the corrugated wall, the mold blocks being so formed that the tubular mold tunnel has a corrugated wall, the extrusion head means being for forming a first tube of thermoplastic material at a first position and for forming a second tube of thermoplastic material at a second position spaced forwardly of said first position, and said gas pressure means being for urging the first tube outwardly against the cooperatively interengaged mold blocks forming the tubular mold tunnel to form the corrugated wall of the tubing, with means being provided for urging the second tube into securement with the corrugations of the first tube, wherein the apparatus further comprises heater means for softening the thermoplastic material of the first tube to ensure said securement thereof to the second tube.

In order that the invention may be more clearly understood and more readily carried into effect the same will now, by way of example, be more fully described with reference to the accompanying drawings in which.

Figure 1:
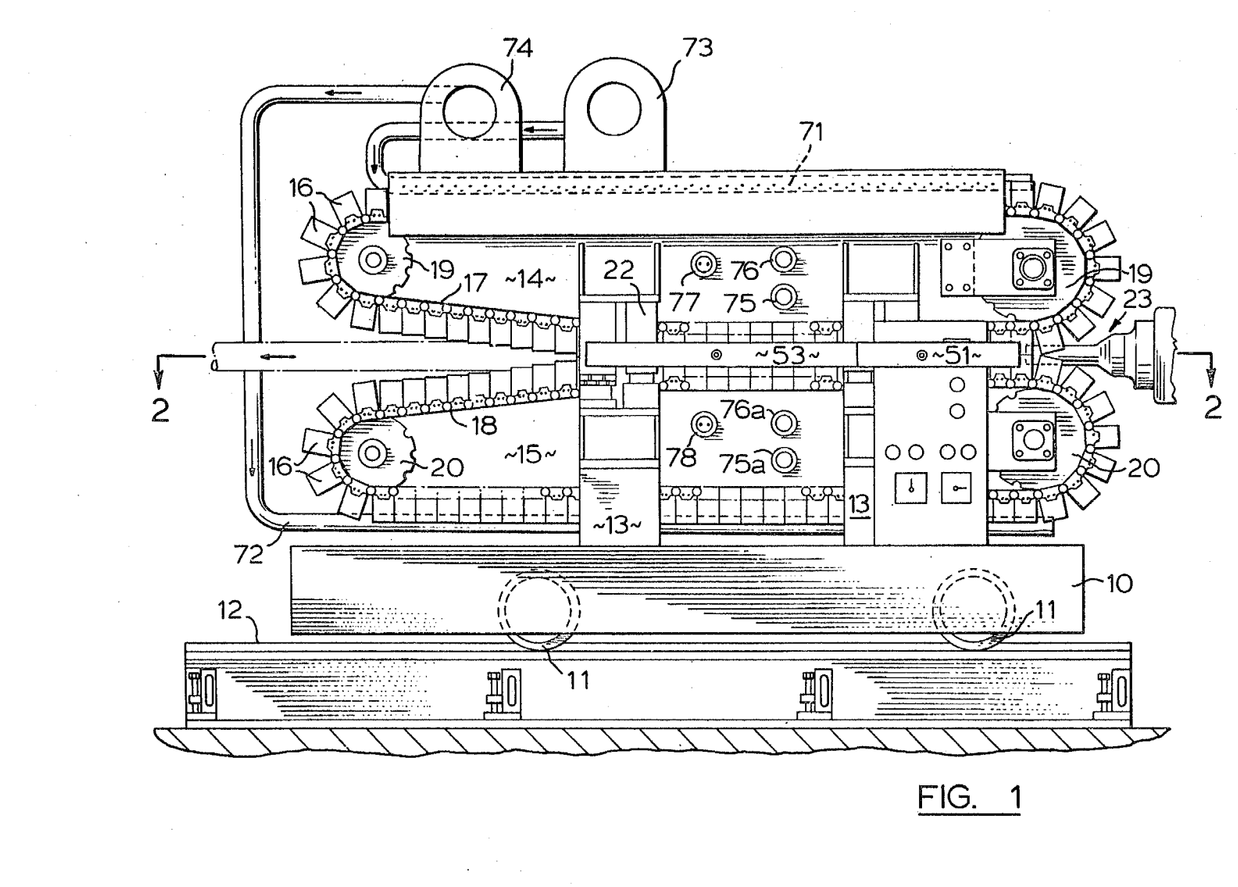
FIG. 1 is a side view of apparatus according to a preferred embodiment of the invention.

Referring to the drawings and in particular to FIG. 1 thereof, the apparatus according to the preferred embodiment of the invention comprises a wheeled structure including a carriage 10 having wheels 11 which run on tracks 12. A support structure 13 which is mounted on the carriage 10 supports a pair of complementary upper and lower mold assemblies 14 and 15, respectively, each mold assembly 14 and 15 comprising an endless array of articulately interconnected mold blocks 16. The mold assembly 14 further comprises a pair of transversely spaced endless conveyor chains (only one of which is shown in the drawings and is denoted by the reference numeral 17), with each mold block 16 of the assembly 14 extending transversely between opposed lengths of these chains. The mold assembly 15 likewise further comprises a pair of endless conveyor chains (only one of which is shown in drawings and is denoted by the reference numeral 18), with each mold block 16 of the assembly 15 extending transversely between opposed lengths of this pair of chains including the chain 18. The chains are entrained around drive sprockets 19 and 20, with drive means (not shown) being connected to at least one of the sprockets 19 and to at least one of the sprockets 20 for operatively driving the mold blocks 16 of each assembly 14 and 15 in synchronism along a forward run and back along a return run, the mold blocks 16 of the assemblies 14 and 15 being, in the forward runs, in cooperative interengagement to define an axially extending tubular mold tunnel 21 (FIG. 2).

The support structure 13 includes mechanical jacks 22 interconnecting the upper and lower mold assemblies 14 and 15 and operable for raising the upper assembly 14 from the lower assembly 15, when required, to permit easy access for servicing.

By means of the wheeled carriage 10 the mold assemblies 14 and 15 are operatively positioned to locate extrusion head means 23 at the entrance to the tubular mold tunnel 21, the extrusion head means 23 being operatively coupled to the nozzle of an extrusion machine (not shown) which may be of conventional form. If required, the mold assemblies 14 and 15 can be moved away from the extrusion head means 23 by movement of the wheeled carriage 10 along the tracks 12 in order to provide access to the extrusion head means 23.

Figure 2:
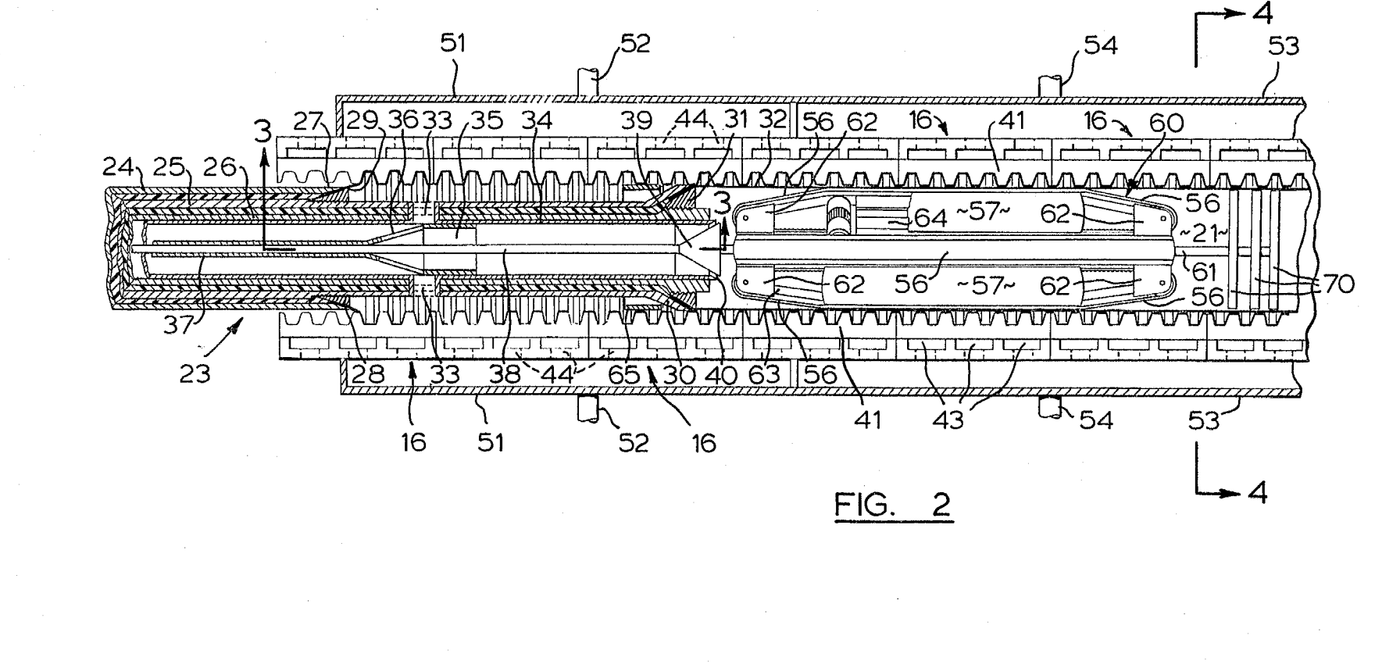
FIG. 2 is an enlarged scale view on the line 2—2 in FIG. 1 of a portion of the apparatus shown in FIG. 1.

With particular reference to FIG. 2, the extrusion head means 23 comprises coaxially disposed tubular members 24, 25 and 26, thermoplastic material operatively being extruded from the extrusion machine and through the space between the members 24 and 25 and the space between a tapered end portion 27 of the member 24 and an annular member 28 mounted on the member 25 to form a first tube 29 of the thermoplastic material at a first position, and thermoplastic material operatively being extruded from the extrusion machine and through the space between the members 25 and 26 and the space between a belled end portion 30 of the member 25 and an annular member 31 mounted on the member 26 to form a second tube 32 of the thermoplastic material at a second position disposed forwarly, i.e downstream, of said first position. The member 28 is screw-threadedly mounted on the member 25 and the member 31 is screw-threadedly mounted on the member 26 for adjustment of the widths of the annular spaces which are defined thereby and through which the first and second tubes 29 and 32, respectively, are formed. The thermoplastic material for the first tube 29 and for the second tube 32 may be extruded from a single supply of thermoplastic material in which case of course the material of the tubes 29 and 32 will be the same, or alternatively may be extruded from different supplies of thermoplastic material in which case the tubes 29 and 32 may be of the same or of different thermoplastic material.

At a position between said first and second positions a plurality of, say, four equi-angularly disposed apertures 33 are provided through the members 25 and 26, the member 26 having a liner 34 branches of which bound the apertures 33 and which is of, for example, polytetrafluoroethylene such as that marketed under the trade mark TEFLON, and a sleeve member 35 being axially slidably mounted within the liner 34 for selectively covering and uncovering the apertures 33. This sleeve member 35 is connected through an open spider member 36 to an axially disposed tubular member 37 which is axially movable by means (not shown) in order to adjust the position of the sleeve member 35 relative to the apertures 33.

The member 37 is mounted on a further tubular member 38 which has mounted thereon a conical member 39 and which is axially movable by means (not shown) selectively to adjust the width of the annular slot 40 between the member 39 and the adjacent end of the liner 34.

Figure 4:
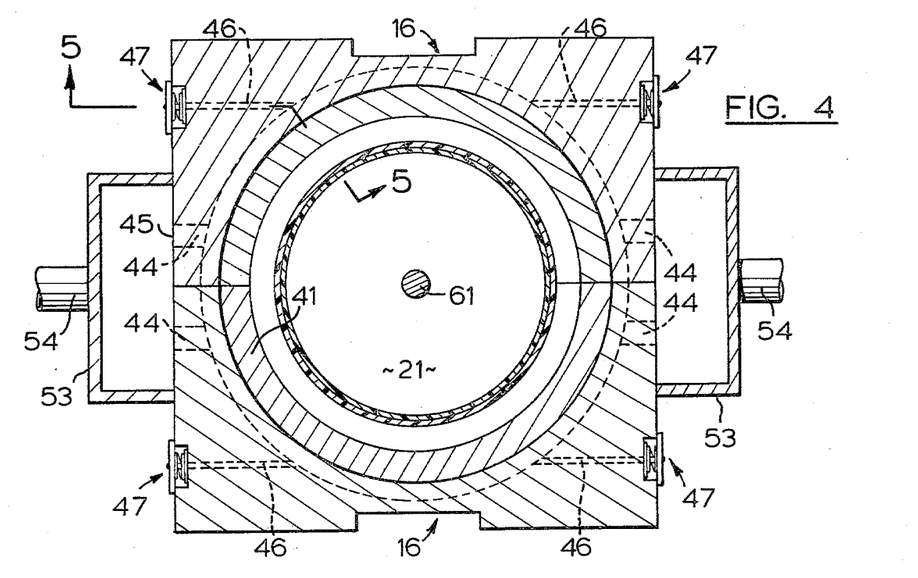
FIG. 4 is a sectioned view, on a still further enlarged scale, on the line 4—4 in FIG. 2.
Figure 5:
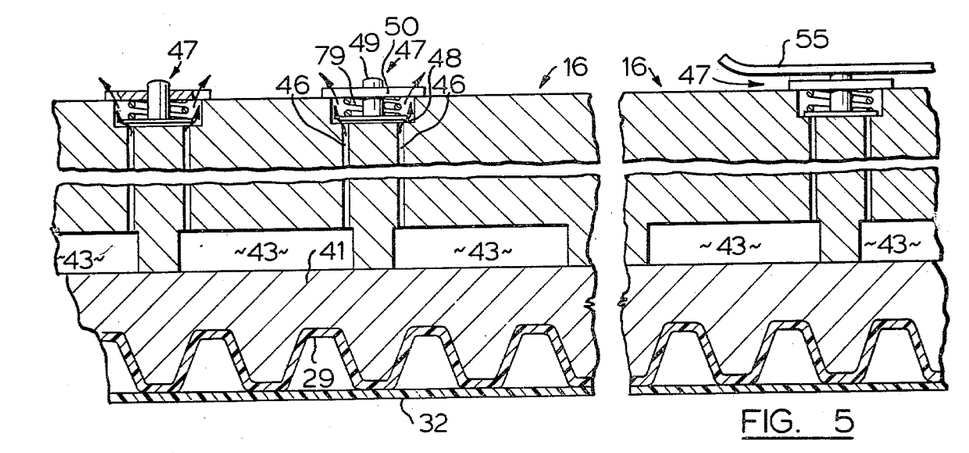
FIG. 5 is a sectioned view on the line 5—5 in FIG. 4.
Figure 6:
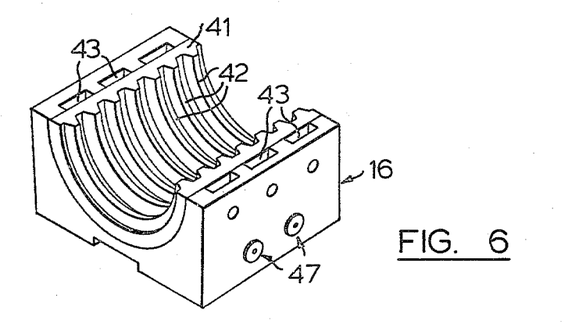
FIG. 6 is a view of one of the mold blocks incorporated in the apparatus.

As is most clearly shown in FIGS. 4, 5 and 6, each mold block 16 according to the preferred embodiment of the invention includes an inner liner 41 which is of sintered metal or other porous material to permit the passage of fluid such as air therethrough. The inner face of the liner 41 is provided with corrugations 42, and channels 43 are provided behind the liner 41 with these channels 43 communicating through passages 44 with ports 45 in external faces of the mold block 16. Thus, the passages 44, the channels 43 and the pores in the liner 41 together constitute first passages which extend between the tubular mold tunnel defining faces of the mold block 16 and the ports 45 in the appropriate external faces of the block 16. It will of course be appreciated that instead of the liner 41 of porous material appropriate apertures may be provided between the channels 43 and the tubular mold tunnel defining faces of each block 16 which present the corrugations 42.

Second passages 46 extend between said first passages, and more particularly between the channels 43 thereof, and external faces of each mold block 16, spring-loaded check valves 47 which constitute closure means for the second passages 46 being provided, with each valve 47 comprising a closure plate 48, an outwardly projecting stem 49 presented by the plate 48, and a plate 50 which is secured to the appropriate external face of te block 16 and through which the stem 49 is slidably disposed. A coil spring 79 is mounted between the plates 48 and 50 thereby resiliently to urge the plate 48 to close the associated second passages 46, the plate 50 having openings therein through which fluid from the second passages 46 may exhaust when the plate 48 is urged away from its closed condition.

Stationary suction chambers 51 which are connectible through pipes 52 with a suction source (not shown) are positioned to communicate through the ports 45 with the abovementioned first passages during movement of the mold blocks 16 along the forward runs thereof, these suction chambers 51 extending approximately between said first and second positions at which the first tube 29 and the second tube 32 are formed, respectively. Further stationary chambers 53 which are connectible through pipes 54 with a source of fluid (not shown) are positioned in axial alignment with the chambers 51 and forwardly thereof for communication through the ports 45 with the above-mentioned first passages during continued movement of the mold blocks 16 beyond the suction chambers 51 along the forward runs thereof. At the location of the forward portions of the chambers 53 there are provided stationary members 55 which, as is shown in the right-hand portion of FIG. 5, serve to engage the stems 49 of the valves 47 to retain the valves 47 in the closed condition thereof.

Although as hereinbefore described and as shown in the accompanying drawings the chambers 53 are each constituted by a single chamber it will be appreciated from the following description of the operation of the apparatus that each of these chambers 53 may be constituted by a stationary cooling chamber and a separate stationary pressure chamber, the cooling chambers being connectible to a source of cooling fluid and the pressure chambers being connectible to a source of pressure fluid, with the stationary members 55 being located to maintain each valve 47 closed while said first passages communicating with the second passages 46 associated with the valve 47 are in communication through the respective ports 45 with the pressure chamber.

As the first tube 29 and the second tube 32 of thermoplastic material are operatively formed with the mold blocks 16 of the mold assemblies 14 and 15 driven in synchronism as hereinbefore described pressurized fluid such as air is supplied to the space between the liner 34 and the member 37, a proportion of this pressurized air passing through the apertures 33 to dispose the first tube 29 against the tubular mold tunnel defining faces of the blocks 16 and to urge the thermoplastic material of this first tube 29 between the corrugations 42 thereby to form the first tube 29 into a corrugated wall, and the remaining proportion of the pressurized air passing through the open spider member 36 and thence through the annular slot 40 to dispose the second tube 32 against the corrugations of the corrugated first tube 29. The proportions of the pressurized air which pass through the apertures 33 and through the slot 40 can, of course, be adjusted by adjustment by the axial position of the sleeve member 35 through axial movement of the member 37, and by adjustment of the member 39 through axial movement of the member 38. It will also be noted that under the influence of the suction source connected through the pipes 52 to the suction chambers 51 air which is entrapped between the corrugations 42 is extracted thereby ensuring that the first tube 29 is properly conformed to the contours of the corrugations 42, the valves 47 maintaining the second passages 46 closed during this operation. The means for supplying the proportion of the pressurized air which passes through the apertures 33 and the suction chambers 51 together constitute gas pressure means for urging the first tube 29 against the mold blocks 16 defining the tubular mold tunnel 21, although said gas pressure means may be constituted solely by said means for supplying said proportion of the pressurized air or by the suction chambers 51.

Figure 8:
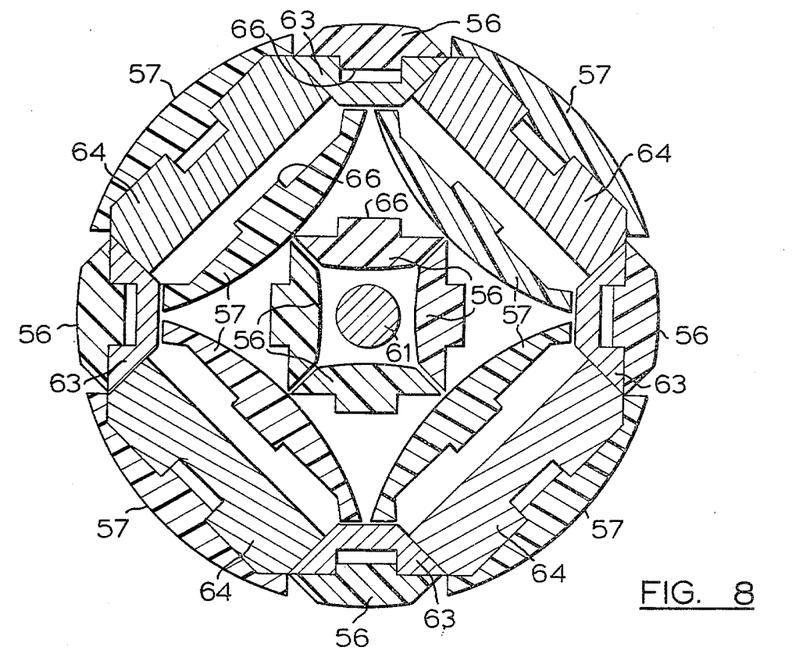
FIGS. 8 and 9 are sectioned views on the lines 8—8 and 9—9, respectively, in FIG. 7.
Figure 9:
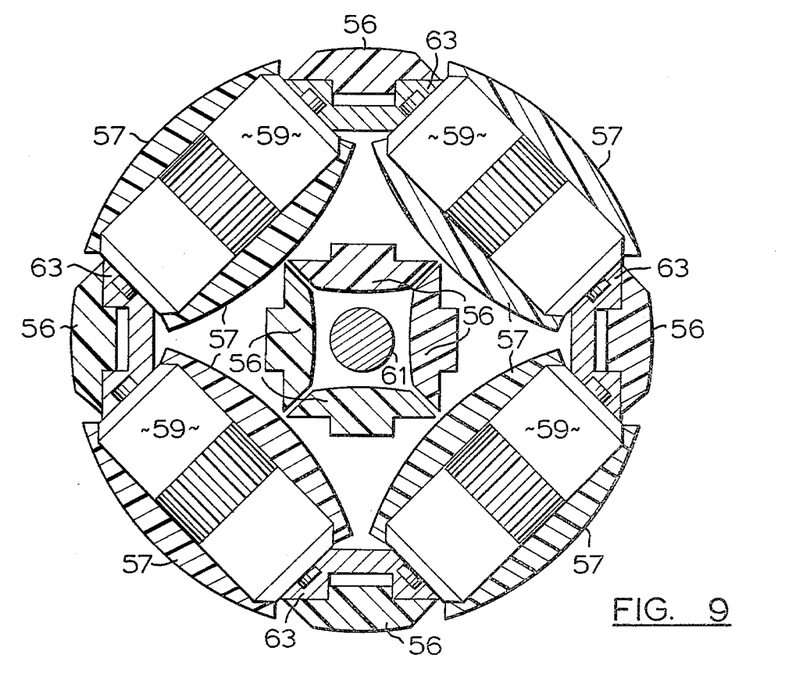

Forwardly of the above-mentioned second position at which the second tube 32 is formed there is provided a series of endless members which are preferably constituted by endless flexible rubber belts 56 and 57. Each of the belts 56 is mounted around rotatable end rolls 58, and each of the belts 57 is likewise mounted around rotatable end rolls 59, the belts 56 constituting a first set and the belts 57 constituting a second set, with the outer runs of the belts 56 alternating with the outer runs of the belts 57, as is clearly shown in FIGS. 7, 8 and 9. A rearward support 60 is fixedly mounted on a fixed shaft 61 which extends axially through the tubular member 38, the support 60 presenting outwardly projecting pairs of lugs 62 between each pair of which one of the end rolls 58 is freely rotatably journalled. Each belt 56 has a fixed track 63 supporting the outer run thereof, the rearward ends of the tracks 63 being secured as by welding 64 between the pairs of lugs 62 adjacent to the associated end rolls 58.

Figure 7:
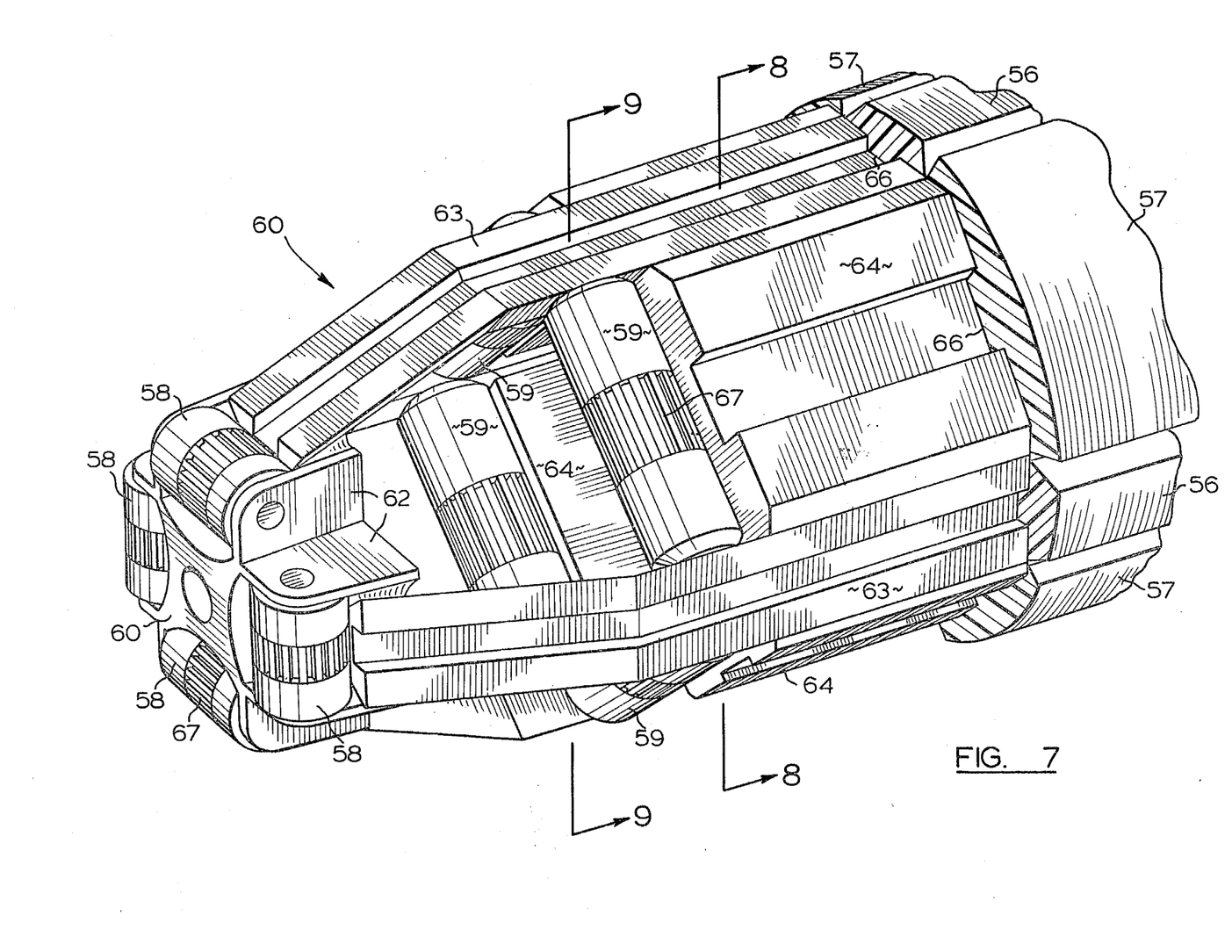
FIG. 7 is a partially broken away view, again on an enlarged scale, of part of the apparatus shown in the preceding views.

As is clearly shown in FIG. 7 the rearward end rolls 59 for the belts 57 are each freely rotatably journalled, forwardly of the rearward end rolls 58, between the tracks 63 of the belts 56, the belts 57 each having a fixed track 64 which supports the outer run thereof and which is secured to the adjacent tracks 63, with the ends of each track 64 terminating adjacent to the associated end rolls 59.

It will of course be appreciated that, although in FIG. 7 the belts 56 and 57 are shown for clarity as being broken away, these belts 56 and 57 are entrained around the associated end rolls 58 and 59, respectively.

The forward end portions of the endless belts 56 and 57 are disposed in a manner corresponding to that of the rearward end portions of these belts 56 and 57 as hereinbefore described with reference to FIG. 7. Thus, the forward end rolls 58 for the first set of belts 56 are disposed forwardly of the forward end rolls 59 for the second set of belts 57, and, as described above, the rearward end rolls 58 for the first set of belts 56 are disposed rearwardly of the rearward end rolls 59 for the second set of belts 57.

The belts 56 and 57, and more particularly the outer runs thereof, move with the second tube 32 and serve to urge the second tube 32 against the corrugations of the first tube 29 as the belts 56 and 57 move around the respective end rolls 58 and 59, thereby to ensure securement between the second tube 32 and the corrugations of the first tube 29, the thermoplastic material of the tubes 32 and 29 being in a sufficiently soft condition to ensure adequate securement therebetween. Heater means preferably comprising an electrically energizeable heating coil 65 (FIG. 2) is provided adjacent to the first tube 29, and between the first position at which the first tube 29 is formed and the second position at which the second tube 32 is formed and preferably immediately rearwardly of said second position, in order sufficiently to soften the thermoplastic material of the first tube 29 to ensure satisfactory securement thereof to the second tube 32.

It will be noted that the outer runs of the endless belts 56 are outwardly inclined from the rearward end rolls 58 to substantially the location of the rearward end rolls 59 for the endless belts 57. The purpose of this feature, which is achieved by correspondingly inclining the rearward end portions of the tracks 63 as is shown in FIG. 7, is to ensure that the outer runs of all the belts 56 and 57 contact the second tube 32 at substantially the same axial location, the outer runs of the belts 56 at this location being of course substantially at the same diameter as the outer runs of the belts 57. Otherwise, if the belts 56 contacted the second tube 32 at a position rearwardly of the position at which the belts 57 contacted the tube 32 there could be a tendency for the second tube 32 to be distorted or deformed since of course the thermoplastic material thereof is in a soft condition. The outer runs of the belts 56 may preferably be correspondingly inclined at the forward end portions thereof, as shown in FIG. 2.

The outer faces of the belts 56 and 57 are preferably of curved convex form, as shown in FIG. 7, substantially to conform with the inner face of the second tube 32 of thermoplastic material. Furthermore, the inner faces of the belts 56 and 57 may be provided with teeth 66 which mesh with teeth 67 provided on the end rolls 58 and 59, respectively, in order to prevent slippage between the belts 56 and 57 and the associated end rolls 58 and 59, respectively. Prevention of such slippage is of particular significance where the belts 56 and 57 are positively driven by drive means (not shown) connected to the end rolls 58 and 59.

Baffles 70 are mounted on the end of the shaft 61, these baffles 70 serving to maintain the required pressure of the proportion of the pressurized air which passes through the annular slot 40 to dispose the second tube against the corrugations of the corrugated first tube 29.

Figure 10:
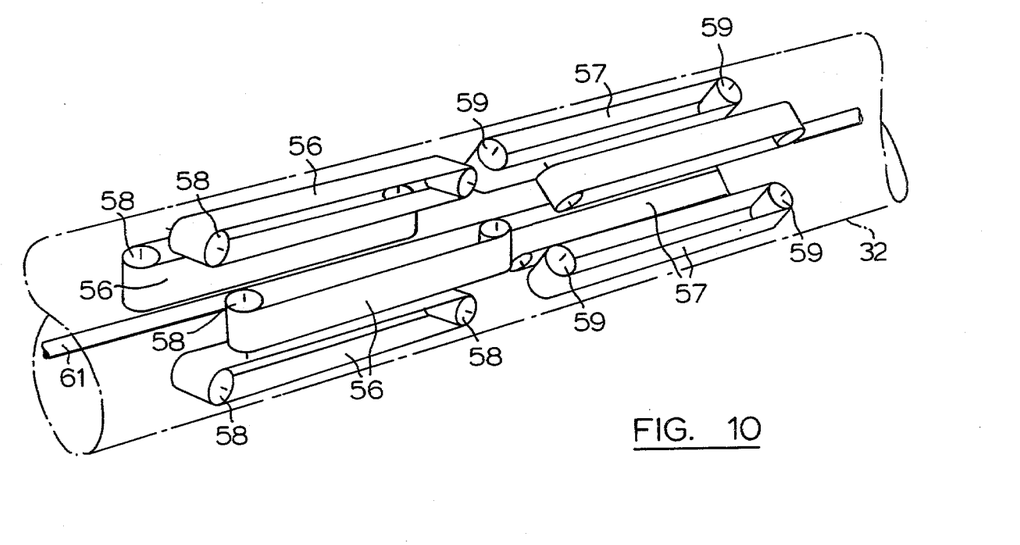
FIG. 10 is a diagrammatic view of an alternative embodiment of the part of the apparatus shown in FIGS. 7, 8 and 9.

FIG. 10 shows, diagrammatically, an alternative embodiment in which the second set of belts 57 is disposed forwardly of the first set of belts 56, the belts 57 of the second set being so angularly offset about the axis of the tubular mold tunnel 21 relative to the belts 56 of the first set that as viewed along the above-mentioned axis the belts 57, and in particular the outer runs thereof, alternate preferably in overlapping relationship with the belts 56, and particularly the outer runs thereof. In this alternative embodiment shown in FIG. 10 the rearward end rolls 58 for the belts 56, the forward end rolls 58 for the belts 56, the rearward end rolls 59 for the belts 57, and the forward end rolls 59 for the belts 57 are rotatably journalled in supports which are fixedly mounted on the shaft 61 and which each corresponds to the support 60 shown in FIG. 7. For clarity these supports have not been shown in FIG. 10.

An appropriate cooling and pressure fluid such as air is circulated from the source thereof through the pipes 54, the chambers 53 and the above-mentioned first passages and is then exhausted through the second passages 46 and the valves 47 which are urged by the pressure of the fluid to the open condition thereof when the pressure of the fluid exceeds a predetermined value dependent on the setting of the valves 47. Thus, the mold blocks 16 are cooled with resultant cooling of the tubes 29 and 32 to cause setting of the thermoplastic material thereof. Thereafter, the multi-walled tubing constituted by the corrugated first tube 29 and the substantially smooth second tube 32 is positively ejected from the mold blocks 16 at the forward end of the tubular mold tunnel by the pressurized air passing from the chambers 53 through the above-mentioned first passages, with the second passages 46 being closed by the valves 47 which are retained in the closed condition by the stationary members 55. Where each of the chambers 53 is constituted by a cooling chamber and a separate pressure chamber as hereinbefore disclosed, the cooling fluid which is supplied to the cooling chambers may, of course, be constituted by a different fluid from the pressure fluid which is supplied to the pressure chambers.

It will be understood that in alternative embodiments (not shown) the valves 47 may be omitted, with stationary members positioned correspondingly to the members 55 being provided for directly closing the second passages 46 and with similar stationary members being provided for closing the second passages 46 while the above-mentioned first passages with which said second passages 46 communicate are in communication with the suction chambers 51. Furthermore, such stationary members which are constituted by suction ducts may be provided for communication with the second passages 46 while the cooling fluid is supplied to the above-mentioned first passages with which said second passages 46 are in communication thereby to increase the rate of flow of the cooling fluid and hence increase the rate of cooling of the mold blocks 16.

Figure 3:
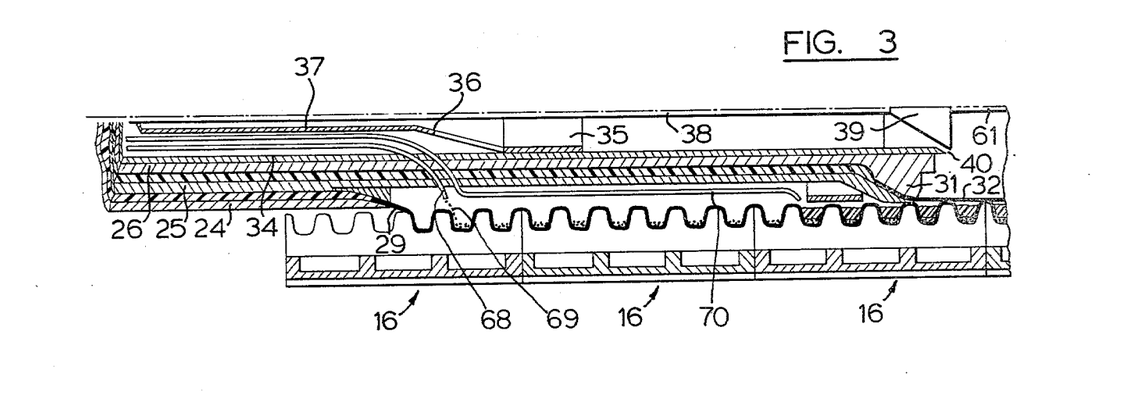
FIG. 3 is a vertically sectioned view, on a further enlarged scale, on the line 3—3 in FIG. 2.

As shown in FIG. 3, means comprising a tube 68 is provided in the extrusion head means 23, this tube 68 serving operatively to deposit particles 69 of a tracer material such as, for example, a metallic material or a radioactive material along the bottom of the inside face of the first tube 29 between the first position at which the first tube 29 is formed and the second position at which the second tube 32 is formed. The provision of these particles 69 of tracer material permits the location of the tubing to be detected after the tubing is disposed underground.

As is also shown in FIG. 3, means comprising a tube 70 is provided in the extrusion head means 23 for depositing a foamable material such as a polyurethane in the corrugations formed in the first tube 29, the chemical composition of this foamable material which may be of known form being such that after the second tube 32 has been secured to the corrugations of the first tube 29 the foamable material foams substantially to occupy the corrugations in the first tube 29 thereby, for example, to strengthen the multi-walled tubing. If the foamed material is porous perforations may be provided in the first tube 29 and the second tube 32 so that the foamed material can be used to perform a filtering function.

If desired an outer substantially smooth tube may be provided around the corrugated first tube 29 so that the multi-walled tubing which is formed then comprises this outer substantially smooth tube, the inner substantially smooth tube 32 and the corrugated tube 29 sandwiched therebetween.

With particular reference again to FIG. 1, each mold assembly 14, 15 may further comprise an air distributing duct 71, 72 extending along the return run of the mold blocks 16 of the respective mold assembly 14 or 15 and positioned to distribute cooling air to the exposed interior surfaces of the mold blocks 16 as they travel along the return run. The distributing ducts 71, 72 are each connected to a respective blower 73, 74 by which the cooling air is supplied to them. Each mold assembly 14, 15 further comprises a heat sink provided by a tank through which cooling water may be circulated, inlet and outlet water connections 75, 76 and 75a, 76a being shown. The mold assembly housings may be cooled in this manner during a molding operation; however, in order to avoid wastage of material at the commencement of a molding operation, the water in the housings may be preheated to the required temperature by electrical immersion heaters mounted in the walls of the housings as shown at 77, 78.

What we claim as our invention is:

1. Apparatus for producing thermoplastic tubing, the apparatus comprising a pair of complementary mold assemblies each of which has an endless array of articulately interconnected mold blocks, drive means for driving the mold blocks of each mold assembly in synchronism with the mold blocks of the other mold assembly along a forward run in which the mold blocks of the mold assemblies are in cooperative interengagement to provide an axially extending tubular mold tunnel, and back along a return run, and an extrusion head disposed at the entrance to the tubular mold tunnel for forming a tube of thermoplastic material, wherein in the mold blocks first passages extend between the tubular mold tunnel defining faces and first ports in external faces of the mold blocks, and second passages extend between the first passages and second ports in external faces of the mold blocks, a stationary suction chamber which is connectible to a suction source being positioned to communicate through said first ports with said first passages during movement of the mold blocks along the forward runs, a stationary cooling chamber which is connectible to a source of cooling fluid being positioned forwardly of the suction chamber to communicate through said first ports with said first passages during continued movement of the mold blocks beyond the suction chamber along the forward runs, a stationary pressure chamber which is connectible to a source of pressurized fluid being positioned forwardly of the cooling chamber to communicate through said first ports with said first passages during further continued movement of the mold blocks beyond the cooling chamber along the forward runs, with closure means being mounted in the mold blocks for closing said second passages while the first passages communicating therewith are in communication through said first ports with the suction chamber and with the pressure chamber, and for opening said second passages while the first passages communicating therewith are in communication through said first ports with the cooling chamber and said second port of each second passage, and the closure means thereof, being positioned outside the chambers while the first passage or passages communicating with said second passage is in communication with the cooling chamber.

2. Apparatus according to claim 1, wherein the cooling chamber and pressure chamber are constituted by a combined chamber.

3. Apparatus according to claim 1, wherein the closure means for closing each second passage comprises a spring-loaded check valve which is normally in a closed condition under the influence of the spring loading thereof but which is movable to an open condition thereby to exhaust fluid from said second passage through the second port thereof when the fluid pressure in said second passage exceeds a predetermined value, a stationary member engaging the valve to maintain the valve in the closed condition thereof while the first passage or passages communicating with said second passage is in communication with the pressure chamber.

4. Apparatus for producing multi-walled thermoplastic tubing having a corrugated wall and a substantially smooth inner wall secured to the corrugated wall, the apparatus comprising a pair of complementary mold assemblies each of which has an endless array of articulately interconnected mold blocks, drive means for driving the mold blocks of each mold assembly in synchronism with the mold blocks of the other mold assembly along a forward run in which the mold blocks of the mold assemblies are in cooperative interengagement to provide an axially extending tubular mold tunnel having a corrugated wall, and back along a return run, extrusion head means for forming a first tube of thermoplastic material at a first position and for forming a second tube of thermoplastic material at a second position spaced forwardly of said first position, and gas pressure means for urging the first tube of thermoplastic material outwardly against the cooperatively interengaged mold blocks forming the tubular mold tunnel to form the corrugated wall of the tubing, wherein a series of endless members are each mounted forwardly of said second position around rotatable end rolls for urging the second tube into securement with the corrugations of the first tube, said endless members comprising a first set of a plurality of said endless members and a second set of a plurality of said endless members, outer runs of the endless members of the first set thereof alternating with outer runs of the endless members of the second set, and the forward end rolls for the first set of endless members being disposed forwardly of the forward end rolls for the second set of endless members, with the rearward end rolls for the first set of endless members being disposed rearwardly of the rearward end rolls for the second set of endless members, and wherein a forward support and a rearward support are fixedly mounted within the tubular mold tunnel with the forward and rearward end rolls for the first set of endless members being rotatably journalled in the forward and rearward supports, respectively, and wherein each endless member has a fixed track supporting the outer run thereof, the tracks of the first set of endless members being secured to the fixed supports, and each track of the second set of endless members being secured to the tracks of the adjacent endless members of the first set thereof, with each end roll of the second set of endless members being rotatably journalled in the tracks of the adjacent endless members of the first set thereof.

5. Apparatus according to claim 4, wherein the apparatus further comprises heater means for softening the thermoplastic material of the first tube to ensure said securement thereof to the second tube.

6. Apparatus according to claim 5, wherein the heater means comprises an electrically energizeable heating coil disposed adjacent to the first tube.

7. Apparatus according to claim 5, wherein the heater means is located between the first position at which the first tube is operatively formed and the second position at which the second tube is operatively formed, and immediately rearwardly of said second position.

8. Apparatus for producing multi-walled thermoplastic tubing having a corrugated wall and a substantially smooth inner wall secured to the corrugated wall, the apparatus comprising a pair of complementary mold assemblies each of which has an endless array of articulately interconnected mold blocks, drive means for driving the mold blocks of each mold assembly in synchronism with the mold blocks of the other mold assembly along a forward run in which the mold blocks of the mold assemblies are in cooperative interengagement to provide an axially extending tubular mold having a corrugated wall, and back along a return run, extrusion head means for forming a first tube of thermoplastic materials at a first position and for forming a second tube of thermoplastic material at a second position spaced forwardly of said first position, and gas pressure means for urging the first tube of thermoplastic material outwardly against the cooperatively interengaged mold blocks forming the tubular mold tunnel to form the corrugated wall of the tubing, wherein a series of endless members are each mounted forwardly of said second position around rotatable end rolls for urging the second tube into securement with the corrugations of the first tube, said endless members comprising a first set of a plurality of said endless members and a second set of a plurality of said endless members, outer runs of the endless members of the first set alternating with outer runs of the endless members of the second set, and the forward end rolls for the first set of endless members being disposed forwardly of the forward end rolls for the second set of endless members, with the rearward end rolls for the first set of endless members being disposed rearwardly of the rearward end rolls for the second set of endless members, and wherein the outer runs of the endless members of the first set are outwardly inclined from the rearward end rolls therefor to substantially the location of the rearward end rolls for the endless members of the second set at which location the outer runs of the endless members of the first set are substantially at the same diameter as the outer runs of the endless members of the second set.

9. Apparatus for producing multi-walled thermoplastic tubing having a corrugated wall and a substantially smooth inner wall secured to the corrugated wall, the apparatus comprising a pair of complementary mold assemblies each of which has an endless array of articulately interconnected mold blocks, drive means for driving the mold blocks of each mold assembly in synchronism with the mold blocks of the other mold assembly along a forward run in which the mold blocks of the mold assemblies are in cooperative interengagement to provide an axially extending tubular mold tunnel having a corrugated wall, and back along a return run, extrusion head means for forming a first tube of thermoplastic material at a first position and for forming a second tube of thermoplastic material at a second position spaced forwardly of said first position, and gas pressure means for urging the first tube of thermoplastic material outwardly against the cooperatively interengaged mold blocks forming the tubular mold tunnel to form the corrugated wall of the tubing, wherein a series of endless members are each mounted forwardly of said second position around rotatable end rolls for urging the second tube into securement with the corrugations of the first tube, wherein in the mold blocks first passages extend between the tubular mold tunnel defining faces and first ports in external faces of the mold blocks, and second passages extend between the first passages and second ports in external faces of the mold blocks, a stationary suction chamber which is connectible to a suction source being positioned to communicate through said first ports with said first passages during movement of the mold blocks along the forward runs, a stationary cooling chamber which is connectible to a source of cooling fluid being positioned forwardly of the suction chamber to communicate through said first ports with said first passages during continued movement of the mold blocks beyond the suction chamber along the forward runs, a stationary pressure chamber which is connectible to a source of pressurized fluid being positioned forwardly of the cooling chamber to communicate through said first ports with said first passages during further continued movement of the mold blocks beyond the cooling chamber along the forward runs, with closure means being mounted on the mold blocks for closing said second passages while the first passages communicating therewith are in communication through said first ports with the suction chamber and with the pressure chamber, and for opening said second passages while the first passages communicating therewith are in communication through said first ports with the cooling chamber, said second port of each second passage, and the closure means thereof, being positioned outside the chambers while the first passage or passages communicating with said second passage is in communication with the cooling chamber, and the first passages and the suction chamber comprising said gas pressure means.

10. Apparatus according to claim 9, wherein the cooling chamber and pressure chamber are constituted by a combined chamber.

11. Apparatus according to claim 9, wherein the closure means for closing each second passage comprises a spring-loaded check valve which is normally in a closed condition under the influence of the spring loading thereof but which is movable to an open condition thereby to exhaust fluid from said second passage through the second port thereof when the fluid pressure in said second passage exceeds a predetermined value, a stationary member engaging the valve to maintain the valve in the closed condition thereof while the first passage or passages communicating with said second passage is in communication with the pressure chamber.

* * * * *